US012400649B2

(12) United States Patent
Fryer-Mcculloch et al.

(10) Patent No.: US 12,400,649 B2
(45) Date of Patent: Aug. 26, 2025

(54) CUSTOMIZED DIALOGUE SUPPORT

(71) Applicants: SONY INTERACTIVE ENTERTAINMENT LLC, San Mateo, CA (US); SONY INTERACTIVE ENTERTAINMENT INC., Tokyo (JP)

(72) Inventors: Morgan Fryer-Mcculloch, San Mateo, CA (US); Victoria Dorn, San Mateo, CA (US); Brielle Powell, San Mateo, CA (US); Steven Osman, San Mateo, CA (US); Geoff Norton, San Mateo, CA (US)

(73) Assignees: SONY INTERACTIVE ENTERTAINMENT LLC; SONY INTERACTIVE ENTERTAINMENT INC., Tokyo (JP)

( * ) Notice: Subject to any disclaimer, the term of this patent is extended or adjusted under 35 U.S.C. 154(b) by 301 days.

(21) Appl. No.: 17/870,498

(22) Filed: Jul. 21, 2022

(65) Prior Publication Data
US 2024/0029725 A1    Jan. 25, 2024

(51) Int. Cl.
*G10L 15/22* (2006.01)
*G06F 3/01* (2006.01)
(Continued)

(52) U.S. Cl.
CPC .............. *G10L 15/22* (2013.01); *G06F 3/013* (2013.01); *G10L 15/18* (2013.01); *G10L 15/30* (2013.01)

(58) Field of Classification Search
CPC ....................................................... G10L 15/22
See application file for complete search history.

(56) References Cited

U.S. PATENT DOCUMENTS

| 7,373,300 B1 | 5/2008 | Bangalore et al. |
| 9,858,925 B2 | 1/2018 | Gruber et al. |

(Continued)

FOREIGN PATENT DOCUMENTS

| WO | PCT/US2023/023866 | 5/2023 |
| WO | PCT/US2023/023872 | 5/2023 |

(Continued)

OTHER PUBLICATIONS

International Search Report and Written Opinion issued on Aug. 15, 2023 for International Application No. PCT/US2023/023866 (15 Pages).

(Continued)

*Primary Examiner* — Jialong He
(74) *Attorney, Agent, or Firm* — Kilpatrick Townsend & Stockton LLP

(57) ABSTRACT

Systems and methods for customized dialogue support in virtual environments are provided. Dialogue maps stored in memory may specify dialogue triggers each associated with a corresponding dialogue instruction. Data regarding an interactive session associated with a user device may be monitored based on one or more of the stored dialogue maps. The presence of one of the dialogue triggers specified by the one or more dialogue maps may be detected based on the monitored data. Customized dialogue output may be generated in response to the detected dialogue trigger and based on the dialogue instruction corresponding to the detected dialogue trigger. The customized dialogue output may be provided to the interactive session in real-time with detection of the detected dialogue trigger.

23 Claims, 5 Drawing Sheets

(51) Int. Cl.
*G10L 15/18* (2013.01)
*G10L 15/30* (2013.01)

(56) References Cited

U.S. PATENT DOCUMENTS

| | | |
|---|---|---|
| 2004/0186730 A1 | 9/2004 | Sun et al. |
| 2007/0226648 A1* | 9/2007 | Hudson ................ A63F 13/533 |
| | | 715/810 |
| 2014/0188480 A1 | 7/2014 | Bangalore et al. |
| 2014/0201629 A1 | 7/2014 | Heck |
| 2014/0236595 A1* | 8/2014 | Gray ..................... G06F 40/174 |
| | | 704/235 |
| 2015/0078562 A1* | 3/2015 | Shanmugasundaram .................... |
| | | G11B 27/005 |
| | | 381/61 |
| 2015/0220512 A1 | 8/2015 | Heinemeyer |
| 2015/0309561 A1 | 10/2015 | Stewart et al. |
| 2016/0091967 A1 | 3/2016 | Prokofieva et al. |
| 2017/0221475 A1* | 8/2017 | Bruguier ................ G10L 15/065 |
| 2017/0300462 A1 | 10/2017 | Cudworth et al. |
| 2017/0358301 A1 | 12/2017 | Raitio et al. |
| 2018/0129484 A1* | 5/2018 | Kannan ................... G06F 3/167 |
| 2018/0277133 A1 | 9/2018 | Deetz et al. |
| 2018/0286392 A1 | 10/2018 | Min et al. |
| 2018/0332169 A1* | 11/2018 | Somech ................ H04L 67/55 |
| 2018/0356957 A1 | 12/2018 | Desjardins |
| 2019/0066668 A1 | 2/2019 | Lin et al. |
| 2019/0321725 A1 | 10/2019 | Zimring et al. |
| 2020/0007474 A1* | 1/2020 | Zhang ..................... G09B 7/02 |
| 2020/0152184 A1 | 5/2020 | Steedman Henderson et al. |
| 2020/0160861 A1 | 5/2020 | Lee |
| 2020/0218780 A1 | 7/2020 | Mei et al. |
| 2020/0342223 A1* | 10/2020 | Mixter ................... G06F 3/011 |
| 2021/0151070 A1 | 5/2021 | Binder et al. |
| 2024/0029726 A1 | 1/2024 | Patel et al. |

FOREIGN PATENT DOCUMENTS

| | | |
|---|---|---|
| WO | WO 2024/019817 | 1/2024 |
| WO | WO 2024/019818 | 1/2024 |

OTHER PUBLICATIONS

International Search Report and Written Opinion issued on Aug. 23, 2023 for International Application No. PCT/US2023/023872 (17 Pages).

U.S. Appl. No. 17/870,510, Office Action dated May 16, 2024.

* cited by examiner

CUSTOMIZED DIALOGUE SUPPORT

BACKGROUND OF THE INVENTION

1. Field of the Invention

The present invention generally relates to dialogue support. More specifically, the present invention relates to communication analytics and customized dialogue support in virtual environments.

2. Description of the Related Art

Presently available digital content (e.g., video games) may allow for interaction with other users within a virtual environment. Thus, many users may enjoy playing such digital content titles in social settings that allow for competitive gameplay, team gameplay, and other social interactions with other users (e.g., friends, teammates, competitors, spectators). Such social interaction—which may include text-based, voice, or video chat—may take place on one or more different platforms (e.g., game platform server, lobby server, chat server, other service provider). Thus, the users in the same interactive session may have different options for communicating with each other, as well as interacting with the virtual environment. Such communications may not only enhance success in gameplay, but enhances social relationships and enjoyment of the interactive content title as well.

Some interactive content titles allow for numerous players to engage with each simultaneously within an in-game virtual environment. In addition, the virtual environment may include a number of in-game events occurring at a fast pace, thereby requiring users to react quickly in order to succeed in gameplay. Thus, efficient and effective player communication may be crucial to successfully navigate increasingly complex virtual environments. Some users, however—particularly those with stutters, lisps, or other speech or verbal fluency conditions and disabilities affecting speech or verbalization—may face obstacles or otherwise have difficulty in communicating effectively at the pace of others. As a result, such communication obstacles and difficulties may adversely affect their gameplay success, enjoyment, and social experience with an interactive game title.

There is, therefore, a need in the art for improved systems and methods of customized dialogue support in virtual environments.

SUMMARY OF THE CLAIMED INVENTION

Embodiments of the present invention include systems and methods for customized dialogue support in virtual environments. Dialogue maps stored in memory may specify dialogue triggers each associated with a corresponding dialogue instruction. Data regarding an interactive session associated with a user device may be monitored based on one or more of the stored dialogue maps. The presence of one of the dialogue triggers specified by the one or more dialogue maps may be detected based on the monitored data. Customized dialogue output may be generated in response to the detected dialogue trigger and based on the dialogue instruction corresponding to the detected dialogue trigger. The customized dialogue output may be provided to the interactive session in real-time with detection of the detected dialogue trigger.

DETAILED DESCRIPTION

Embodiments of the present invention include systems and methods for customized dialogue support in virtual environments. Systems and methods for customized dialogue support in virtual environments are provided. Dialogue maps stored in memory may specify dialogue triggers each associated with a corresponding dialogue instruction. Data regarding an interactive session associated with a user device may be monitored based on one or more of the stored dialogue maps. The presence of one of the dialogue triggers specified by the one or more dialogue maps may be detected based on the monitored data. Customized dialogue output may be generated in response to the detected dialogue trigger and based on the dialogue instruction corresponding to the detected dialogue trigger. The customized dialogue output may be provided to the interactive session in real-time with detection of the detected dialogue trigger.

Figure 1:
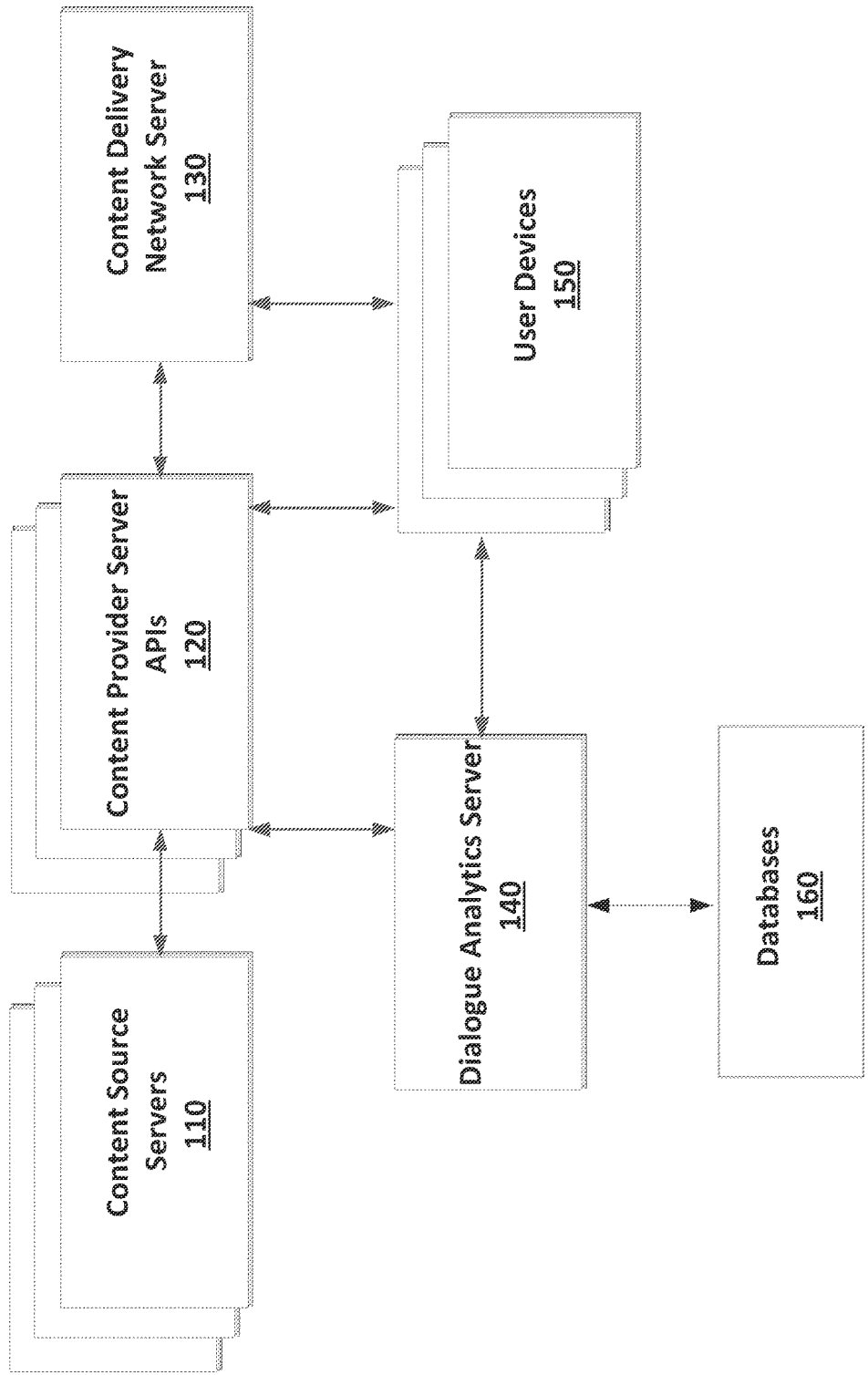
FIG. 1 illustrates a network environment in which a system for customized dialogue support in virtual environments may be implemented.

FIG. 1 illustrates a network environment 100 in which a system for customized dialogue support in virtual environments may be implemented. The network environment 100 may include one or more content source servers 110 that provide digital content (e.g., games, other applications and services) for distribution, one or more content provider server application program interfaces (APIs) 120, content delivery network server 130, dialogue analytics server 140, and one or more user devices 150. The devices in network environment 100 communicate with each other using one or more communication networks, which may include a local, proprietary network (e.g., an intranet) and/or may be a part of a larger wide-area network. The communications networks may be a local area network (LAN), which may be communicatively coupled to a wide area network (WAN) such as the Internet. The Internet is a broad network of interconnected computers and servers allowing for the transmission and exchange of Internet Protocol (IP) data between users connected through a network service provider. Examples of network service providers are the public switched telephone network, a cable service provider, a provider of digital subscriber line (DSL) services, or a satellite service provider. One or more communications networks allow for communication between the various components of network environment 100.

The servers described herein may include any type of server as is known in the art, including standard hardware computing components such as network and media interfaces, non-transitory computer-readable storage (memory), and processors for executing instructions or accessing information that may be stored in memory. The functionalities of multiple servers may be integrated into a single server. Any of the aforementioned servers (or an integrated server) may take on certain client-side, cache, or proxy server characteristics. These characteristics may depend on the particular network placement of the server or certain configurations of the server.

Content source servers 110 may maintain and provide a variety of digital content and digital services available for distribution over a communication network. The content source servers 110 may be associated with any content provider that makes its content available for access over a communication network. The content source servers 110 may therefore host a variety of different interactive content titles, which may further have be associated with object data regarding a digital or virtual object (e.g., activity information, zone information, character information, player information, other game media information, etc.) displayed in a digital or virtual environment during an interactive session.

Such content may include not only digital video and games, but also other types of digital applications and services. Such applications and services may include any variety of different digital content and functionalities that may be provided to user devices 150, including providing and supporting chat and other communication channels. The chat and communication services may be inclusive of voice-based, text-based, and video-based messages. Thus, a user device 150 may participate in a gameplay session concurrent and/or associated with one or more communication sessions, and the gameplay and communication sessions may be hosted on one or more of the content source servers 110.

The content from content source server 110 may be provided through a content provider server API 120, which allows various types of content source servers 110 to communicate with other servers in the network environment 100 (e.g., user devices 150). The content provider server API 120 may be specific to the particular operating language, system, platform, protocols, etc., of the content source server 110 providing the content, as well as the user devices 150 and other devices of network environment 100. In a network environment 100 that includes multiple different types of content source servers 110, there may likewise be a corresponding number of content provider server APIs 120 that allow for various formatting, conversion, and other cross-device and cross-platform communication processes for providing content and other services to different user devices 150, which may each respectively use different operating systems, protocols, etc., to process such content. As such, applications and services in different formats may be made available so as to be compatible with a variety of different user device 150. In a network environment 100 that includes multiple different types of content source servers 110, content delivery network servers 130, dialogue analytics server 140, user devices 150, and databases 160, there may likewise be a corresponding number of APIs managed by content provider server APIs 120.

The content provider server API 120 may further facilitate access of each of the user devices 150 to the content hosted or services provided by the content source servers 110, either directly or via content delivery network server 130. Additional information, such as metadata, about the accessed content or service can also be provided by the content provider server API 120 to the user device 150. As described below, the additional information (e.g., object data, metadata) can be usable to provide details about the content or service being provided to the user device 150. In some embodiments, the services provided from the content source servers 110 to the user device 150 via the content provider server API 120 may include supporting services that are associated with other content or services, such as chat services, ratings, and profiles that are associated with a particular game, team, community, etc. In such cases, the content source servers 110 may also communicate with each other via the content provider server API 120.

The content delivery network server 130 may include a server that provides resources, files, etc., related to the content from content source servers 110, including various content and service configurations, to user devices 150. The content delivery network server 130 can also be called upon by the user devices 150 that request to access specific content or services. Content delivery network server 130 may include universe management servers, game servers, streaming media servers, servers hosting downloadable content, and other content delivery servers known in the art.

Dialogue analytics server 140 may include any data server known in the art that is capable of communicating with the different content source servers 110, content provider server APIs 120, content delivery network server 130, user devices 150, and databases 160. Such dialogue analytics server 140 may be implemented on one or more cloud servers that carry out instructions associated with interactive content (e.g., games, activities, video, podcasts, User Generated Content ("UGC"), publisher content, etc.). The dialogue analytics servers 140 may further carry out instructions, for example, for monitoring one or more interactive sessions based on one or more selected dialogue maps. Specifically, the dialogue analytics server 140 may monitor for one or more dialogue triggers as specified by the selected dialogue maps. When the dialogue triggers are detected, the dialogue analytics server 140 may generate customized dialogue output in accordance with the corresponding dialogue instruction specified by the dialogue map and provide the customized dialogue output within the interactive session.

The user device 150 may include a plurality of different types of computing devices. The user device 150 may be a server that provides an internal service (e.g., to other servers) in network environment 100. In such cases, user device 150 may correspond to one of the content servers 110 described herein. Alternatively, the user device 150 may be a computing device that may include any number of different gaming consoles, mobile devices, laptops, and desktops. Such user devices 150 may also be configured to access data from other storage media, such as, but not limited to memory cards or disk drives as may be appropriate in the case of downloaded services. Such user devices 150 may include standard hardware computing components such as, but not limited to network and media interfaces, non-transitory computer-readable storage (memory), and processors for executing instructions that may be stored in memory. These user devices 150 may also run using a variety of different operating systems (e.g., iOS, Android), applications or computing languages (e.g., C++, JavaScript). An exemplary client device 150 is described in detail herein with respect to FIG. 5. Each user device 150 may be associated with participants (e.g., players) or other types (e.g., spectators) of users in relation to a collection of digital content streams.

While pictured separately, the databases 160 may be stored on any of the servers and devices illustrated in network environment 100 on the same server, on different servers, or on any of the user devices 150. Such databases 160 may store or link to various sources and services used for dialogue analytics and customized dialogue output generation. In addition, databases 160 may store dialogue maps, as well as language usage models, which may be specific to a particular user, user group or team, user category or condition, themes, content genre, content title, sound types, etc. Language usage models may be developed and refined over time for use in identifying different types of speech patterns associated with certain speech conditions (e.g., stutter), which may serve as a dialogue trigger of a customized dialogue output that replaces certain speech and/or provides speech assistance or support to the user.

In some implementations, dialogue maps may be newly generated, stored in databases 160, and shared (including being made available for purchase) with other users, as well as further customized to the specific needs and preferences of an individual user. Thus, dialogue maps may also be stored in the databases 160 in association with each user for whom the maps are customized. Dialogue triggers may also be defined based on gameplay data regarding the user (e.g., user progress in an activity and/or media content title, user ID, user game characters, etc.) or other parameters. The dialogue map may further specify that each dialogue trigger corresponds to a dialogue instruction executable to generated customized dialogue output, which may be provided to the user device of the monitored user and/or to other users in the same interactive session.

Language usage models may be built and continually refined to analyze speech patterns related to dialogue triggers, such as stutters. Different models may be developed for different users, as well as different game titles (and common words and phrases used in such game titles). Such language models may be used not only to identify when certain audio sounds match a trigger, but also to predict when a trigger is likely to occur based on data regarding the current interactive session and its in-game events and conditions. Artificial intelligence and machine learning techniques may continually refine such models over time as more data is gathered regarding the user or similarly-situated users, as well as new game titles. The language usage models may also be used to analyze new users and make recommendations as to which models may be most applicable to the characteristics and conditions of the user and current interactive session.

For example, certain users with certain speech conditions may find certain sounds, words, or phrases difficult to verbalize. In the context of a game or other interactive activity, the inability to speak effectively to other players in the current game session may represent an accessibility barrier that prevents the user from succeeding at or enjoying session interaction. Such a user may preconfigure customized dialogue maps with dialogue triggers corresponding to sounds, words, or phrases that are particularly challenging to the user (or users having a common speech condition). The dialogue triggers may not necessarily be the sounds, words, or phrases themselves, but rather associated indicators that such sounds, words, or phrases may need to be spoken. In addition, the dialogue trigger may also include physical gestures (e.g., captured by a camera, motion detector, or other sensor) or controller-based inputs (e.g., entered using a game controller, keyboard, keypad, touchscreen, or other input devices), which allow the user to indicate when the user predicts or identifies that a predetermined sound, word, or phrase will need to be spoken. Such mapped inputs may therefore serve as a custom shortcut command to implement associated dialogue support options.

The user may also preconfigure corresponding dialogue instructions that are executable to process the portion of the session stream including the detected dialogue trigger in customized ways. For example, the dialogue instructions may refer to specific pre-recorded speech audio clips by the user (or other users, computer-generated voices, or combinations of the same) or preconfigured text messages, which may also be stored in databases and retrieved as needed in accordance with the dialogue instruction and associated dialogue trigger. A user may therefore customize a dialogue map by defining new types of dialogue triggers and specifying which dialogue instruction(s) to execute when the dialogue trigger is detected. The dialogue instruction may be executable to output specific types of dialogue, including translation into text-based messages, one or more pre-recorded sounds or clips, or modifications to a current recording. The modifications may include slowing down portions of the recording (e.g., sounds leading up to predicted stutter), speeding up portions of the recording (e.g., stutter sounds), otherwise standardizing or smoothing the pacing of speech (versus speech that abruptly starts and stops), changes in pitch, tonality, or other character of speech, including modifications to sound like famous voices, fanciful or creature voices, or other voice or sound modifications as desired by the user to adjust how their voice may be presented to others. Such custom dialogue maps may be shared with other users, as well as bought or sold as add-on purchases associated with a game console, game title, or accessory product.

In exemplary implementations, a microphone may also be used to capture data regarding speech by the user in real-time during a current interactive session. The speech by the user may also be analyzed by dialogue analytics server 140 in accordance with one or more dialogue maps, the selection of which may be based on user preference or analytics that match the user with dialogue maps selected by or for similar users. In some instances, the user may wish to apply modifications to their own voice to one or more audiences. Different modifications may be applied to different streams. For example, the user's voice may be modified one way in association with one game title (e.g., modified to sound like an in-game character's voice associated with a game title being played in the current session), while being modified in a different way in association with another stream (e.g., modified to lower frequency response, increase or decrease volume, slow down speed, auto-complete or auto-correct broken words or phrases, modified to sound like the voice of a favorite character, celebrity, etc.). In some implementations, the user may further customize a dialogue map upon request based on a calibration session in which the specific speech patterns of the user may be analyzed to set thresholds regarding dialogue triggers and modulate responsive dialogue outputs. As such, user speech may be automatically modified and presented in different ways to different users in accordance with different dialogue maps in accordance with user preferences and characteristics.

Where the user may not wish to modify the sound of their voice, they may opt to specify that the dialogue support output merely provide support or assistance. For example, where a dialogue trigger is detected (or predicted), the dialogue map may specify dialogue instructions corresponding to presentation of available options for prompts that are less likely to trigger a stutter. The dialogue prompts may be pre-selected or identified based on machine learning applied to developing language usage models as to which sounds, words, and phrases are more or less likely to result in a stutter or other trigger condition. Such dialogue prompts may be provided and presented only within a display of the user device of the monitored user, such that other users in the interactive session may not see such display. Upon being presented with the options, the monitored user may input such selection based on gaze-tracking (e.g., by holding their gaze at the desired option for a predetermined period of time).

Figure 2:
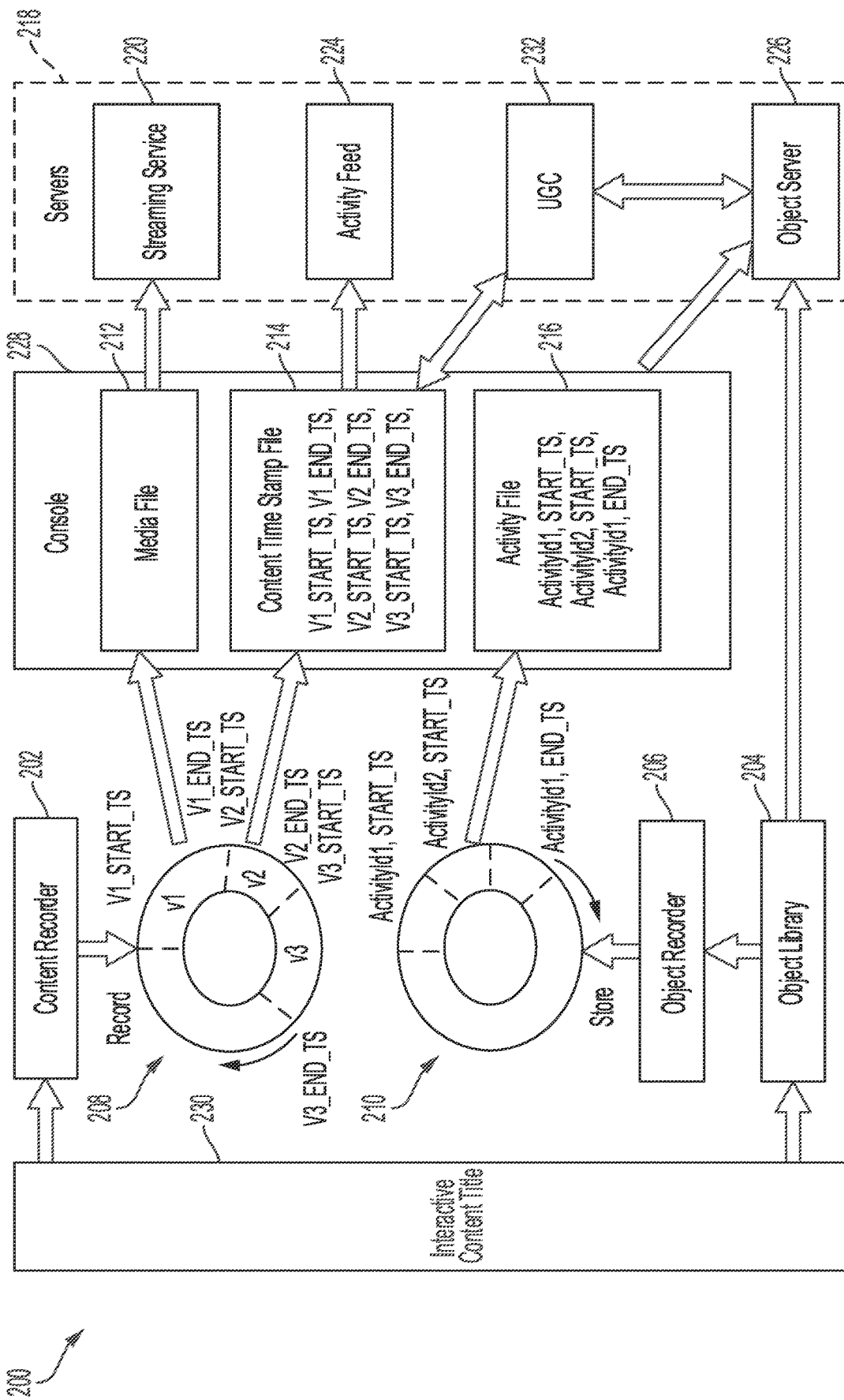
FIG. 2 illustrates an exemplary uniform data system (UDS) that may be used to provide data to a system for customized dialogue support in virtual environments.

FIG. 2 illustrates an exemplary uniform data system (UDS) 200 that may be used to provide data to a system for customized dialogue support in virtual environments. Based on data provided by UDS 200, dialogue analytics server 140 can be made aware of the current session conditions, e.g., what in-game objects, entities, activities, and events that users have engaged with, and thus support analysis of and coordination of customized dialogue support by dialogue analytics server 140 with current gameplay and in-game activities. Each user interaction may be associated the metadata for the type of in-game interaction, location within the in-game environment, and point in time within an in-game timeline, as well as other players, objects, entities, etc., involved. Thus, metadata can be tracked for any of the variety of user interactions that can occur in during a game session, including associated activities, entities, settings, outcomes, actions, effects, locations, and character stats. Such data may further be aggregated, applied to data models, and subject to analytics. Such a UDS data model may be used to assign contextual information to each portion of information in a unified way across games.

For example, various content titles may depict one or more objects (e.g., involved in in-game activities) with which a user can interact and/or UGC (e.g., screen shots, videos, commentary, mashups, etc.) created by peers, publishers of the media content titles and/or third party publishers. Such UGC may include metadata by which to search for such UGC. Such UGC may also include information about the media and/or peer. Such peer information may be derived from data gathered during peer interaction with an object of an interactive content title (e.g., a video game, interactive book, etc.) and may be "bound" to and stored with the UGC. Such binding enhances UGC as the UGC may deep link (e.g., directly launch) to an object, may provide for information about an object and/or a peer of the UGC, and/or may allow a user to interact with the UGC.

As illustrated in FIG. 2, an exemplary console 228 (e.g., a user device 130) and exemplary servers 218 (e.g., streaming server 220, an activity feed server 224, an user-generated content (UGC) server 232, and an object server 226) are shown. In one example, the console 228 may be implemented on the platform server 120, a cloud server, or on any of the servers 218. In an exemplary example, a content recorder 202 may be implemented on the platform server 120, a cloud server, or on any of the servers 218. Such content recorder 202 receives and records content (e.g., media) from an interactive content title 230 onto a content ring-buffer 208. Such ring-buffer 208 may store multiple content segments (e.g., v1, v2 and v3), start times for each segment (e.g., V1_START_TS, V2_START_TS, V3_START_TS), and end times for each segment (e.g., V1_END_TS, V2_END_TS, V3_END_TS). Such segments may be stored as a media file 212 (e.g., MP4, WebM, etc.) by the console 228. Such media file 212 may be uploaded to the streaming server 220 for storage and subsequent streaming or use, though the media file 212 may be stored on any server, a cloud server, any console 228, or any user device 130. Such start times and end times for each segment may be stored as a content time stamp file 214 by the console 228. Such content time stamp file 214 may also include a streaming ID, which matches a streaming ID of the media file 212, thereby associating the content time stamp file 214 to the media file 212. Such content time stamp file 214 may be uploaded and stored to the activity feed server 224 and/or the UGC server 232, though the content time stamp file 214 may be stored on any server, a cloud server, any console 228, or any user device 130.

Concurrent to the content recorder 202 receiving and recording content from the interactive content title 230, an object library 204 receives data from the interactive content title 230, and an object recorder 206 tracks the data to determine when an object beings and ends. The object library 204 and the object recorder 206 may be implemented on the platform server 120, a cloud server, or on any of the servers 218. When the object recorder 206 detects an object beginning, the object recorder 206 receives object data (e.g., if the object were an activity, user interaction with the activity, activity ID, activity start times, activity end times, activity results, activity types, etc.) from the object library 204 and records the activity data onto an object ring-buffer 210 (e.g., ActivityID1, START_TS; ActivityID2, START_TS; ActivityID3, START_TS). Such activity data recorded onto the object ring-buffer 210 may be stored in the object file 216. Such object file 216 may also include activity start times, activity end times, an activity ID, activity results, activity types (e.g., competitive match, quest, task, etc.), user or peer data related to the activity. For example, an object file 216 may store data regarding an item used during the activity. Such object file 216 may be stored on the object server 226, though the object file 216 may be stored on any server, a cloud server, any console 228, or any user device 130.

Such object data (e.g., the object file 216) may be associated with the content data (e.g., the media file 212 and/or the content time stamp file 214). In one example, the UGC server 232 stores and associates the content time stamp file 214 with the object file 216 based on a match between the streaming ID of the content time stamp file 214 and a corresponding activity ID of the object file 216. In another example, the object server 226 may store the object file 216 and may receive a query from the UGC server 232 for an object file 216. Such query may be executed by searching for an activity ID of an object file 216 that matches a streaming ID of a content time stamp file 214 transmitted with the query. In yet another example, a query of stored content time stamp files 214 may be executed by matching a start time and end time of a content time stamp file 214 with a start time and end time of a corresponding object file 216 transmitted with the query. Such object file 216 may also be associated with the matched content time stamp file 214 by the UGC server 232, though the association may be performed by any server, a cloud server, any console 228, or any user device 130. In another example, an object file 216 and a content time stamp file 214 may be associated by the console 228 during creation of each file 216, 214.

In exemplary embodiments, the media files 212 and activity files 216 may provide information to dialogue analytics server 140 regarding current session conditions, which may also be used as another basis for making predictions as to upcoming dialogue triggers, as well as identifying appropriate dialogue support outputs. Dialogue analytics server 140 may therefore use such media files 212 and activity files 216 to identify specific conditions of the current session, including currently speaking or noise-producing players, characters, and objects at specific locations and events. Based on such files 212 and 216, for example, dialogue analytics server 140 may identify a significance level of the in-game event (e.g., significant battles, proximity to breaking records), which may be used to interpret user speech within a particular scene and to filter available dialogue instructions for suitability to current status. Such session conditions may drive how the audio of different audio streams may be interpreted, thereby resulting in decisions as to which dialogue instructions are applied, how such dialogue instructions are applied, and provided to which user devices.

Figure 3:
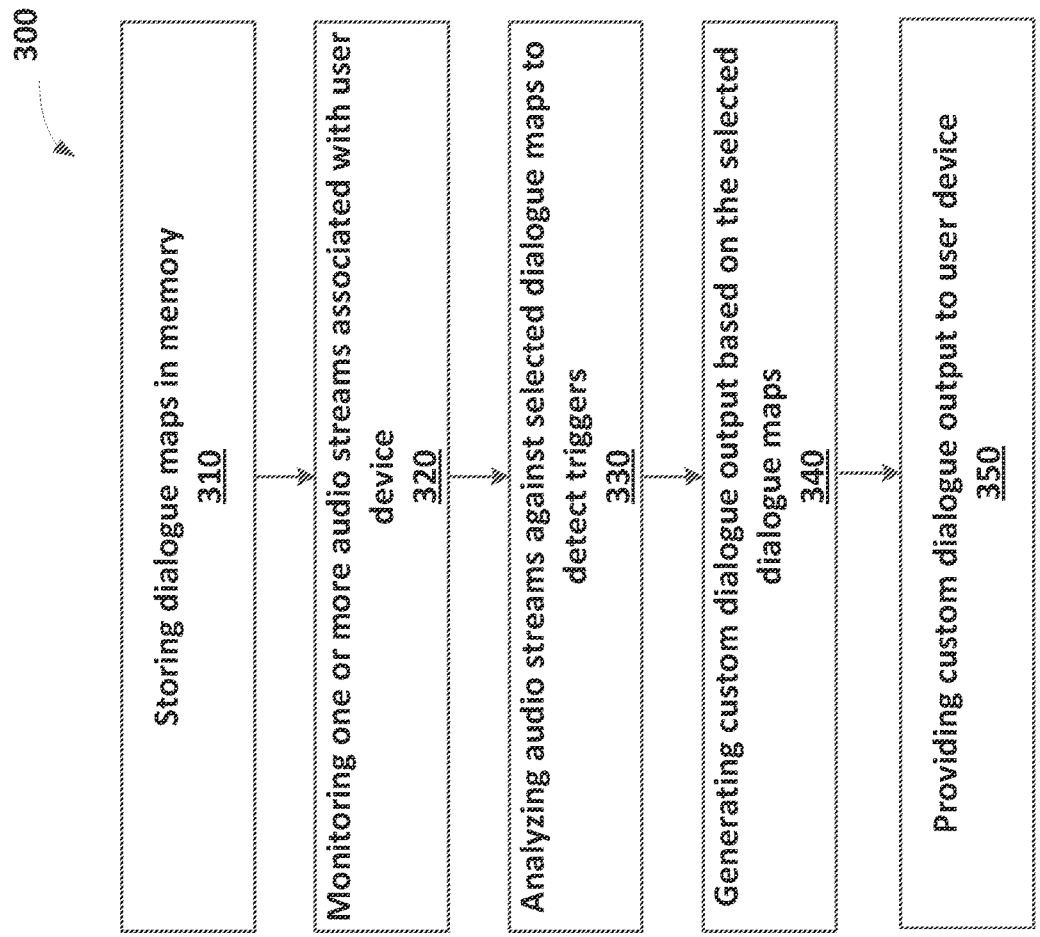
FIG. 3 is a flowchart illustrating an exemplary method for customized dialogue support in virtual environments.

FIG. 3 is a flowchart illustrating an exemplary method 300 for customized dialogue support in virtual environments. The method 300 of FIG. 3 may be embodied as executable instructions in a non-transitory computer readable storage medium including but not limited to a CD, DVD, or non-volatile memory such as a hard drive. The instructions of the storage medium may be executed by a processor (or processors) to cause various hardware components of a computing device hosting or otherwise accessing the storage medium to effectuate the method. The steps identified in FIG. 3 (and the order thereof) are exemplary and may include various alternatives, equivalents, or derivations thereof including but not limited to the order of execution of the same.

In step 310, dialogue maps may be stored in memory (e.g., databases 160). The dialogue profile may include one or more predetermined dialogue triggers and associated dialogue instructions executable to provide customized dialogue output to an interactive session. Different users may be matched to different dialogue maps in accordance with calibration to assess their speech patterns or in accordance with express request or preference. For example, a user may specify a specific type of neurological or physical stutter, and dialogue analytics server 140 may identify which dialogue maps may be most suitable. In some instances, a new user may develop a new dialogue map or customize a current dialogue map in accordance with their own speech patterns (in defining dialogue triggers), as well as personal preferences and priorities in relation to different sounds (in defining dialogue instructions). Dialogue analytics server 140 may also query the new user in order to identify how to generate the custom dialogue map, or to customize specific dialogue triggers or instructions in an existing dialogue map. Dialogue maps may also be specific to different game titles or genre, correlating different types of dialogue triggers with words and phrases commonly used in relation to such game titles and genres. As discussed above, a different set of dialogue maps may be stored for each user.

In step 320, one or more audio streams associated with the user device 150 may be monitored by dialogue analytics server 140. A user using user device 150 to stream and play digital content in a current session may provide audio— through speech and other audio sounds—captured in an audio stream associated with the digital content. One or more microphones in the real-world environment of the user and associated with the user device 150 (e.g., embedded in headphones, controllers, video cameras) may capture such audio and provide to dialogue analytics server 150. The dialogue analytics server 140 may monitor all such audio streams (or any specific subset) based on one or more dialogue maps selected for the user.

In step 330, the audio streams are analyzed by dialogue analytics server 140 against the selected dialogue maps. In particular, the dialogue triggers specified by the dialogue maps may be detected within each of the audio streams. For example, certain triggers associated with undesired speech results (e.g., lisps, stutters) may be identified or predicted in relation to current and upcoming in-game events. Once a dialogue trigger is detected (e.g., identified or predicted), the dialogue map may be consulted to determine which dialogue instruction may be associated with the detected trigger for application to the current interaction session.

In step 340, a custom dialogue output may be generated based on the dialogue instructions specified by the dialogue map as being associated with the detected dialogue trigger. Based on the analysis performed n step 330, dialogue analytics server 140 may determine that a particular dialogue trigger is present (or will soon be present) within the current interaction session and apply the corresponding dialogue instructions to provide dialogue support to the monitored user. Such support may be in the form of substitute or replacement speech by a pre-recorded clip of the user's own natural voice, as well as other pre-recorded or computer-generated voices and sounds, which are provided to the other user devices in the same interactive session in place of the identified or predicted dialogue trigger. In some instances, the user may opt to have alternative words and phrases provided as dialogue prompts in lieu of having to speak the triggering words or phrases. The dialogue prompts may also be selectable (based on any combination of input including gaze-tracking) to trigger pre-recorded custom audio clips.

In step 350, the customized dialogue output may be provided to the current interactive session. Depending on the dialogue instruction, such customized dialogue output may be provided only to the user device of the monitored user or to other user devices of other users. For example, selectable dialogue prompts may only be presented to the monitored user in a private window or overlay that is not provided to nor viewable by other users. Where the customized dialogue output may be substitute or replacement audio, however, such audio may be played in the current interactive session in place of the user-generated audio that was identified as a dialogue trigger. Because prediction may be used to identify a dialogue trigger, the associated customized dialogue output may be generated and provided to the interactive session in real-time or near real-time with detection of the dialogue trigger.

Figure 4:
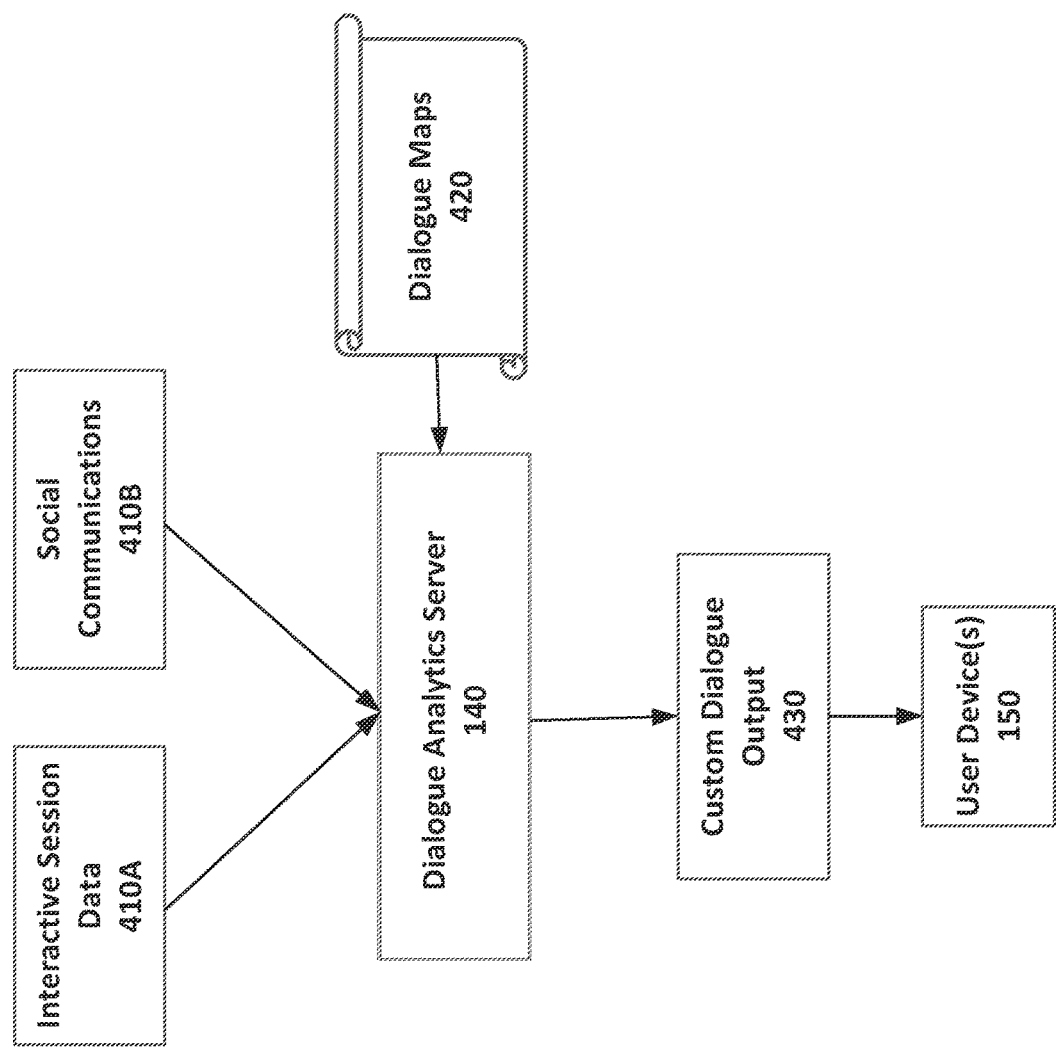
FIG. 4 is a diagram illustrating an exemplary implementation of customized dialogue support in virtual environments.

FIG. 4 is a diagram illustrating an exemplary implementation of customized dialogue support in virtual environments. As illustrated, different data streams 410A-B associated with a current interactive session of a user device may be provided to dialogue analytics server 140 for analysis and processing. Interactive data stream 410A may be associated with an interactive content title and include regarding with play of that interactive content title, which may be used to interpret and detect dialogue triggers. Social communication stream 410B may be associated with communications by the user of the user device 150. The social communication stream 410B may be analyzed by dialogue analytics server 140 in conjunction with the interactive session data 410A and one or more dialogue maps 420 to assess and detect dialogue triggers and to generate customized dialogue output in accordance with corresponding dialogue instructions.

Dialogue analytics server 140 may select and obtain the dialogue map(s) from one of the databases 160 based on characteristics of the user or the game title of the current interactive session. Using the selected dialogue map(s), dialogue analytics server 140 may analyze various session parameters that occur concurrently across the different data streams 410A-B. For example, in-game event data from interactive data stream 410A may be occurring concurrently with voice chat messages from social communications stream 410B. Data from the different streams may be analyzed by the dialogue analytics server 140 to identify (predict) dialogue triggers. The dialogue analytics server 140 may further identify what dialogue instructions are specified by the dialogue map(s) in association with the dialogue trigger. The identified dialogue instructions may then be retrieved—along with any associated pre-recorded clips—and executed by dialogue analytics server 140 to generate one or more custom dialogue outputs 430. The custom dialogue output 430 may then be provided to the user device 150 of the monitored user privately or provided to all user devices in the same current interactive session.

Figure 5:
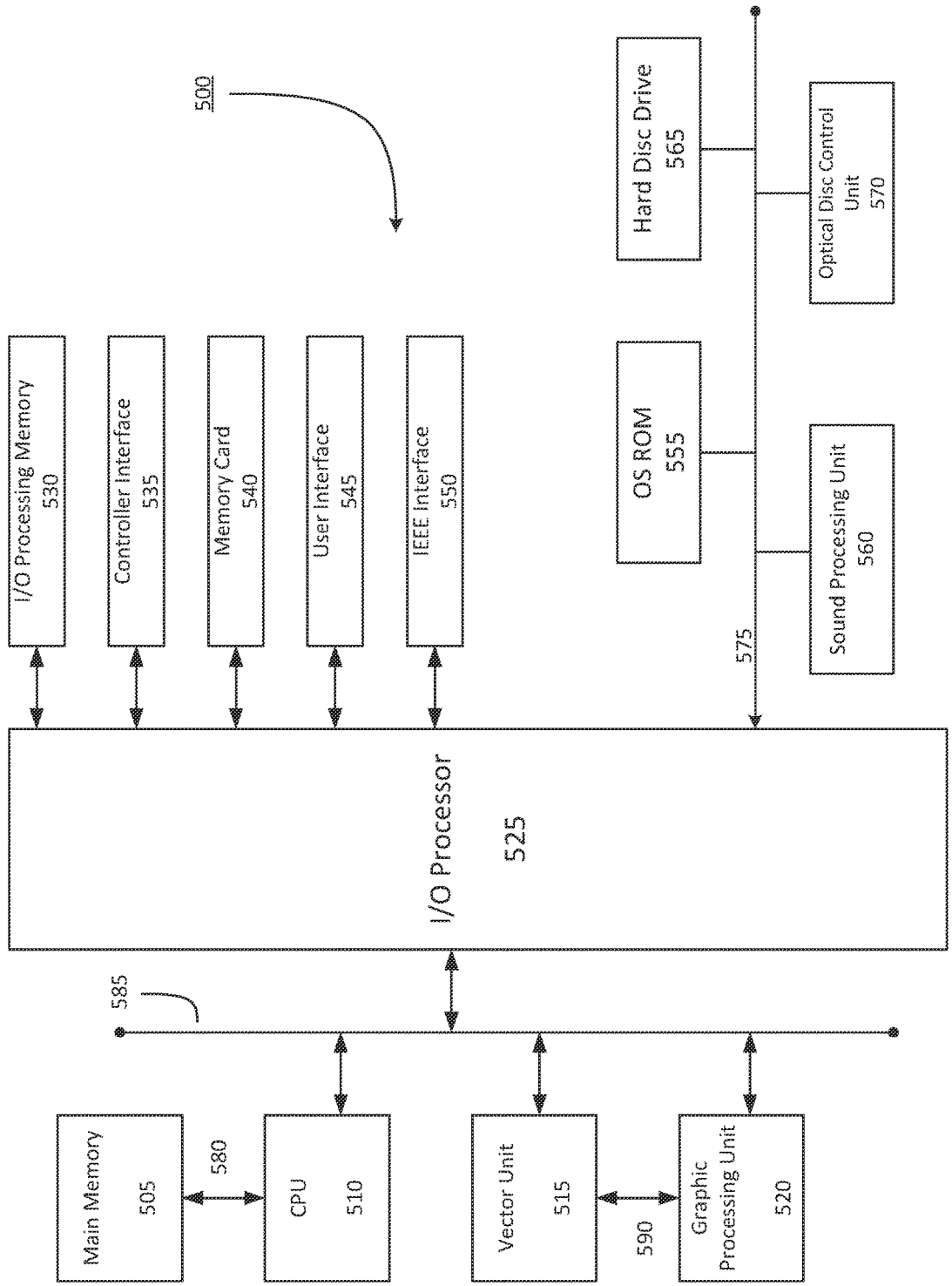
FIG. 5 is a block diagram of an exemplary electronic entertainment system that may be used in embodiments of the present invention.

FIG. 5 is a block diagram of an exemplary electronic entertainment system that may be used in embodiments of the present invention. The entertainment system 500 of FIG. 5 includes a main memory 505, a central processing unit (CPU) 510, vector unit 515, a graphics processing unit 520, an input/output (I/O) processor 525, an I/O processor memory 530, a controller interface 535, a memory card 540, a Universal Serial Bus (USB) interface 545, and an IEEE interface 550. The entertainment system 500 further includes an operating system read-only memory (OS ROM) 555, a sound processing unit 560, an optical disc control unit 570, and a hard disc drive 565, which are connected via a bus 575 to the I/O processor 525.

Entertainment system 500 may be an electronic game console. Alternatively, the entertainment system 500 may be implemented as a general-purpose computer, a set-top box, a hand-held game device, a tablet computing device, or a mobile computing device or phone. Entertainment systems may contain more or less operating components depending on a particular form factor, purpose, or design.

The CPU 510, the vector unit 515, the graphics processing unit 520, and the I/O processor 525 of FIG. 5 communicate via a system bus 585. Further, the CPU 510 of FIG. 5 communicates with the main memory 505 via a dedicated bus 580, while the vector unit 515 and the graphics processing unit 520 may communicate through a dedicated bus 590. The CPU 510 of FIG. 5 executes programs stored in the OS ROM 555 and the main memory 505. The main memory 505 of FIG. 5 may contain pre-stored programs and programs transferred through the I/O Processor 525 from a CD-ROM, DVD-ROM, or other optical disc (not shown) using the optical disc control unit 570. I/O Processor 525 of FIG. 5 may also allow for the introduction of content transferred over a wireless or other communications network (e.g., 4$, LTE, 3G, and so forth). The I/O processor 525 of FIG. 5 primarily controls data exchanges between the various devices of the entertainment system 500 including the CPU 510, the vector unit 515, the graphics processing unit 520, and the controller interface 535.

The graphics processing unit 520 of FIG. 5 executes graphics instructions received from the CPU 510 and the vector unit 515 to produce images for display on a display device (not shown). For example, the vector unit 515 of FIG. 5 may transform objects from three-dimensional coordinates to two-dimensional coordinates, and send the two-dimensional coordinates to the graphics processing unit 520. Furthermore, the sound processing unit 560 executes instructions to produce sound signals that are outputted to an audio device such as speakers (not shown). Other devices may be connected to the entertainment system 500 via the USB interface 545, and the IEEE 1394 interface 550 such as wireless transceivers, which may also be embedded in the system 500 or as a part of some other component such as a processor.

A user of the entertainment system 500 of FIG. 5 provides instructions via the controller interface 535 to the CPU 510. For example, the user may instruct the CPU 510 to store certain game information on the memory card 540 or other non-transitory computer-readable storage media or instruct a character in a game to perform some specified action.

The present invention may be implemented in an application that may be operable by a variety of end user devices. For example, an end user device may be a personal computer, a home entertainment system (e.g., Sony PlayStation2® or Sony PlayStation3® or Sony PlayStation4®), a portable gaming device (e.g., Sony PSP® or Sony Vita®), or a home entertainment system of a different albeit inferior manufacturer. The present methodologies described herein are fully intended to be operable on a variety of devices. The present invention may also be implemented with cross-title neutrality wherein an embodiment of the present system may be utilized across a variety of titles from various publishers.

The present invention may be implemented in an application that may be operable using a variety of devices. Non-transitory computer-readable storage media refer to any medium or media that participate in providing instructions to a central processing unit (CPU) for execution. Such media can take many forms, including, but not limited to, non-volatile and volatile media such as optical or magnetic disks and dynamic memory, respectively. Common forms of non-transitory computer-readable media include, for example, a floppy disk, a flexible disk, a hard disk, magnetic tape, any other magnetic medium, a CD-ROM disk, digital video disk (DVD), any other optical medium, RAM, PROM, EPROM, a FLASHEPROM, and any other memory chip or cartridge.

Various forms of transmission media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU. Various forms of storage may likewise be implemented as well as the necessary network interfaces and network topologies to implement the same.

The foregoing detailed description of the technology has been presented for purposes of illustration and description. It is not intended to be exhaustive or to limit the technology to the precise form disclosed. Many modifications and variations are possible in light of the above teaching. The described embodiments were chosen in order to best explain the principles of the technology, its practical application, and to enable others skilled in the art to utilize the technology in various embodiments and with various modifications as are suited to the particular use contemplated. It is intended that the scope of the technology be defined by the claim.

What is claimed is:

1. A method for customized dialogue support in virtual environments, the method comprising:
    storing a plurality of dialogue maps in memory, each dialogue map specifying a plurality of dialogue triggers each associated with a corresponding dialogue instruction, and each dialogue map being specific to one or more particular game titles of different video games;
    monitoring audio data captured from a user device during a stream of an interactive session of a user playing a video game, wherein the audio data includes dialogue spoken by the user;
    selecting one or more dialogue maps based on the dialogue and based on a title of the video game played by the user;
    predicting, using a language usage model specific to speech patterns of the user of the user device, that one of the dialogue triggers of the associated dialogue maps is likely to occur based on:
        matching one or more speech patterns specified by the language usage model to the dialogue from the user device; and
        identifying an upcoming in-game event in the video game where the dialogue trigger is likely to occur;

generating customized dialogue output in response to the predicted dialogue trigger, wherein generating the customized dialogue output is performed in real-time and is based on the dialogue instruction corresponding to the predicted dialogue trigger; and providing the customized dialogue output at a portion of the interactive session stream upon occurrence of the upcoming in-game event.

2. The method of claim 1, wherein the language usage model is a machine-learning model continually refined to analyze speech patterns for at least one of different users and different game titles.

3. The method of claim 1, wherein the prediction of when the predicted dialogue trigger is likely to occur is based on comparing a predetermined pattern of speech associated with the user to speech of the user during the interactive session.

4. The method of claim 1, wherein the dialogue instruction corresponding to the predicted dialogue trigger is executable to modify an audio stream of speech by the user of the user device by replacing at least a portion of the audio stream with a replacement portion, and wherein the replacement portion is provided to one or more other user devices in the interactive session in place of the replaced portion of the audio stream upon occurrence of the upcoming in-game event.

5. The method of claim 1, wherein the dialogue instruction corresponding to the predicted dialogue trigger is executable to modify a display of the user device to include one or more prompts associated with the predicted dialogue trigger.

6. The method of claim 5, wherein the prompts are selectable based on gaze data from gaze-tracking of the user within the virtual environment.

7. The method of claim 1, wherein at least one of the dialogue maps is specific to a predetermined theme, and wherein the dialogue triggers and the corresponding dialogue instruction include words and phrases associated with the predetermined theme.

8. The method of claim 1, wherein at least one of the dialogue maps specifies a dialogue trigger that includes at least one of gesture, controller input, or custom shortcut input.

9. The method of claim 1, wherein at least one of the dialogue maps specifies a dialogue instruction executable to play a pre-recorded audio clip in the interactive session.

10. The method of claim 1, further comprising customizing one of the dialogue maps for the user of the user device, wherein customizing the dialogue map includes:
calibrating for one or more identified speech patterns and abilities of the user; and
defining one or more of the dialogue triggers based on the calibration.

11. The method of claim 1, further comprising preconfiguring the corresponding dialogue instruction in accordance with a custom shortcut command, and defining one or more of the dialogue triggers based on the custom shortcut command.

12. A system for customized dialogue support in virtual environments, the system comprising:
memory that stores a plurality of dialogue maps, each dialogue map specifying a plurality of dialogue triggers each associated with a corresponding dialogue instruction, and each dialogue map being specific to one or more particular game titles of different video games;
a communication interface that communicates over a communication network, wherein the communication interface receives audio data captured from a user device during a stream of an interactive session of a user playing a video game, wherein the audio data includes dialogue spoken by the user; and
a processor that executes instructions stored in memory, wherein the processor executes the instructions to:
monitor the received audio data captured during the stream of the interactive session;
select one or more dialogue maps based on the dialogue and based on a title of the video game played by the user;
predict, using a language usage model specific to speech patterns of the user of the user device, that one of the dialogue triggers of the associated dialogue maps is likely to occur based on:
matching one or more of the speech patterns specified by the language usage model to the dialogue from the user device; and
identifying an upcoming in-game event in the video game where the dialogue trigger is likely to occur; and
generate customized dialogue output in response to the predicted dialogue trigger, wherein generating the customized dialogue output is performed in real-time and is based on the dialogue instruction corresponding to the predicted dialogue trigger;
wherein the communication interface provides the customized dialogue output at a portion of the interactive session stream upon occurrence of the upcoming in-game event.

13. The system of claim 12, wherein the language usage model is a machine-learning model continually refined to analyze speech patterns for at least one of different users and different game titles.

14. The system of claim 12, wherein the prediction of when the predicted dialogue trigger is likely to occur is based on comparing a predetermined pattern of speech associated with the user to speech of the user during the interactive session.

15. The system of claim 12, wherein the dialogue instruction corresponding to the predicted dialogue trigger is executable to modify an audio stream of speech by the user of the user device by replacing at least a portion of the audio stream with a replacement portion, and wherein the replacement portion is provided to one or more other user devices in the interactive session in place of the replaced portion of the audio stream upon occurrence of the upcoming in-game event.

16. The system of claim 12, wherein the dialogue instruction corresponding to the predicted dialogue trigger is executable to modify a display of the user device to include one or more prompts associated with the predicted dialogue trigger.

17. The system of claim 16, wherein the prompts are selectable based on gaze data from gaze-tracking of the user within the virtual environment.

18. The system of claim 12, wherein at least one of the dialogue maps is specific to a predetermined theme, and wherein the dialogue triggers and the corresponding dialogue instruction include words and phrases associated with the predetermined theme.

19. The system of claim 12, wherein at least one of the dialogue maps specifies a dialogue trigger that includes at least one of gesture, controller input, or custom shortcut input.

20. The system of claim 12, wherein at least one of the dialogue maps specifies a dialogue instruction executable to play a pre-recorded audio clip in the interactive session.

21. The system of claim 12, wherein the processor executes further instructions to customize one of the dialogue maps for the user of the user device, wherein the processor customizes the dialogue map by: calibrating for one or more identified speech patterns and abilities of the user; and defining one or more of the dialogue triggers based on the calibration.

22. The system of claim 12, wherein the processor executes further instructions to preconfigure the corresponding dialogue instruction in accordance with a custom shortcut command, and define one or more of the dialogue triggers based on the custom shortcut command.

23. A non-transitory, computer-readable storage medium, having embodied thereon a program executable by a processor to perform a method for customized dialogue support in virtual environments, the method comprising:

storing a plurality of dialogue maps in memory, each dialogue map specifying a plurality of dialogue triggers each associated with a corresponding dialogue instruction, and each dialogue map being specific to one or more particular game titles of different video games;

monitoring audio data captured from a user device during a stream of an interactive session of a user playing a video game, wherein the audio data includes dialogue spoken by the user;

selecting one or more dialogue maps based on the dialogue and based on a title of the video game played by the user;

predicting, using a language usage model specific to speech patterns of the user of the user device, that one of the dialogue triggers of the associated dialogue maps is likely to occur based on:

matching one or more speech patterns specified by the language usage model to the dialogue from the user device; and identifying an upcoming in-game event in the video game where the dialogue trigger is likely to occur, generating customized dialogue output in response to the predicted dialogue trigger, wherein generating the customized dialogue output is performed in real-time and is based on the dialogue instruction corresponding to the predicted dialogue trigger; and providing the customized dialogue output at a portion of the interactive session stream upon occurrence of the upcoming in-game event.

* * * * *